(12) United States Patent
Gawande et al.

(10) Patent No.: US 8,154,998 B2
(45) Date of Patent: Apr. 10, 2012

(54) METHOD AND APPARATUS FOR RESIZING A TRUNK IN A NETWORK

(75) Inventors: Mohan Gawande, Cranbury, NJ (US); Kamlesh Tewani, Freehold, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 73 days.

(21) Appl. No.: 12/189,519

(22) Filed: Aug. 11, 2008

(65) Prior Publication Data

US 2010/0034086 A1   Feb. 11, 2010

(51) Int. Cl.
*H04L 1/00* (2006.01)
(52) U.S. Cl. ......... 370/230; 370/235; 370/252; 370/468
(58) Field of Classification Search .................. None
See application file for complete search history.

(56) References Cited

U.S. PATENT DOCUMENTS

| | | | |
|---|---|---|---|
| 6,359,879 B1 * | 3/2002 | Carvey et al. | 370/351 |
| 6,657,993 B1 * | 12/2003 | Casanova et al. | 370/352 |
| 7,324,553 B1 * | 1/2008 | Varier et al. | 370/468 |
| 2005/0195741 A1 * | 9/2005 | Doshi et al. | 370/230 |
| 2007/0115825 A1 * | 5/2007 | Roberts | 370/235 |

* cited by examiner

*Primary Examiner* — Chi H. Pham
*Assistant Examiner* — Shick Hom

(57) ABSTRACT

A method and apparatus for resizing a trunk in a network are disclosed. For example, the method sets one or more target utilization levels for one or more trunks, and gathers trunk load data from one or more switches in the network in accordance with a pre-determined time period. The method evaluates the trunk load data in accordance with one or more trigger points for resizing the one or more trunks, wherein the one or more trigger points is based on the one or more target utilization levels. The method then resizes the one or more trunks if the one or more trigger points are reached or exceeded.

20 Claims, 4 Drawing Sheets

METHOD AND APPARATUS FOR RESIZING A TRUNK IN A NETWORK

The present invention relates generally to communication networks and, more particularly, to a method and apparatus for providing resizing of trunks in networks such as the packet networks, e.g., Internet Protocol (IP) networks, Asynchronous Transfer Mode (ATM) networks, Frame Relay (FR) networks, and the like.

BACKGROUND OF THE INVENTION

An enterprise customer may build a Virtual Private Network (VPN) by connecting multiple sites or users over a network operated by a telephony or network service provider. For example, the enterprise customer's devices such as Customer Edge Routers (CERs) may be connected to the network service provider's Layer 3 Provider Edge Router (PER) using a Layer 2 network. The Layer 2 network can be an Asynchronous Transfer Mode (ATM) network and/or a Frame Relay (FR) network. The voice and data packets from the customer premise may traverse the Layer 2 network prior to reaching an IP network. For example, a virtual connection such as a Permanent Virtual Circuit (PVC) may be established for the customer through a Layer 2 network, e.g., an ATM network. The service provider determines the size of the PVC for the customer traffic prior to establishing the PVC. However, the actual load may change over a period of time. For example, the customer may have more traffic than anticipated, thereby causing an increase in delay and/or packet loss due to congestion. Although a network service provider may over engineer the network to anticipate this potential increase in customer traffic, over engineering increases the cost of the network and wastes valuable network resources.

SUMMARY OF THE INVENTION

In one embodiment, the present invention discloses a method and apparatus for resizing one or more trunks in a network. For example, the method sets one or more target utilization levels for one or more trunks, and gathers trunk load data from one or more switches in the network in accordance with a pre-determined time period. The method evaluates the trunk load data in accordance with one or more trigger points for resizing the one or more trunks, wherein the one or more trigger points is based on the one or more target utilization levels. The method then resizes the one or more trunks if the one or more trigger points are reached or exceeded.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present invention broadly discloses a method and apparatus for providing resizing of a trunk in a network. Although the present invention is discussed below in the context of ATM/FR and IP networks, the present invention is not so limited. Namely, the present invention can be applied to other networks, e.g., cellular networks and the like.

Figure 1:
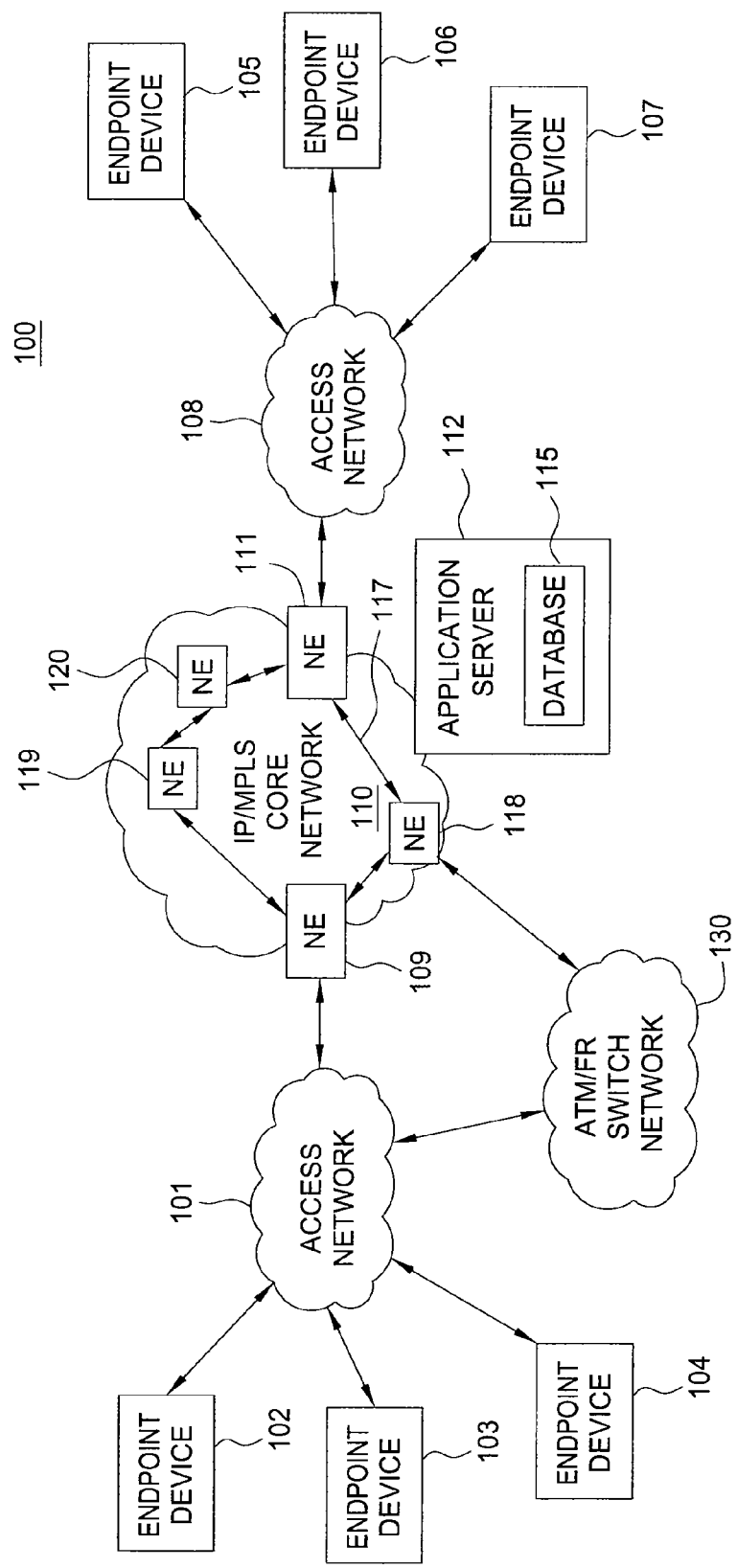
FIG. 1 illustrates an exemplary network related to the present invention.

FIG. 1 is a block diagram depicting an exemplary packet network 100 related to the current invention. Exemplary packet networks include Internet Protocol (IP) networks, Asynchronous Transfer Mode (ATM) networks, Frame-Relay networks, and the like. An IP network is broadly defined as a network that uses Internet Protocol such as IPv4 or IPv6 and the like, to exchange data packets.

In one embodiment, the packet network may comprise a plurality of endpoint devices 102-104 configured for communication with the core packet network 110 (e.g., an IP based core backbone network supported by a service provider) via an access network 101. Similarly, a plurality of endpoint devices 105-107 are configured for communication with the core packet network 110 via an access network 108. The network elements 109 and 111 may serve as gateway servers or edge routers (e.g., broadly as a border element) for the network 110.

The endpoint devices 102-107 may comprise customer endpoint devices such as personal computers, laptop computers, Personal Digital Assistants (PDAs), servers, routers, and the like. The access networks 101 and 108 serve as a means to establish a connection between the endpoint devices 102-107 and the NEs 109 and 111 of the IP/MPLS core network 110. The access networks 101 and 108 may each comprise a Digital Subscriber Line (DSL) network, a broadband cable access network, a Local Area Network (LAN), a Wireless Access Network (WAN), WIFI, and the like.

The access networks 101 and 108 may be either directly connected to NEs 109 and 111 of the IP/MPLS core network 110 or through an Asynchronous Transfer Mode (ATM) and/or Frame Relay (FR) switch network 130. If the connection is through the ATM/FR network 130, the packets from customer endpoint devices 102-104 (traveling towards the IP/MPLS core network 110) traverse the access network 101 and the ATM/FR switch network 130 and reach the border element 109.

The ATM/FR network 130 may contain Layer 2 switches and in some instances terminates on NE 118 in the IP/MPLS Core Network 110. The NE 118 may be an ATM switch and may have a Route Processing Module (RPM) that converts Layer 2 frames to Layer 3 Internet Protocol (IP) packets and thus provides the function of a PER. An RPM enables the transfer of packets from a CER using a Layer 2 Permanent Virtual Connection (PVC) circuit to an IP network which is connectionless.

Some NEs (e.g., NEs 109, 111 and 118) reside at the edge of the core infrastructure and interface with customer endpoints over various types of access networks. An NE that resides at the edge of a core infrastructure is typically implemented as an edge router, a media gateway, a border element, a firewall, a switch, and the like. An NE may also reside within the network (e.g., NEs 119-120) and may be used as a mail server, honeypot, a router, or like device. The IP/MPLS core network 110 may also comprise an application server 112 that contains a database 115. The application server 112 may comprise any server or computer that is well known in the art, and the database 115 may be any type of electronic collection of data that is also well known in the art. Those skilled in the art will realize that although only six endpoint devices, two access networks, five network elements, and one application server are depicted in FIG. 1, the communication system 100 may be expanded by including additional endpoint devices, access networks, network elements, and application servers without altering the present invention.

The above IP network is described to provide an illustrative environment in which packets for voice and data services are transmitted on networks. For example, an enterprise customer may build a Virtual Private Network (VPN) by connecting multiple sites or users over a network operated by a telephony or network service provider. The enterprise customer's devices such as Customer Edge Routers (CERs) may be connected to the network service provider's Layer 2 network through to a Provider Edge Router (PER). The packets from the customer premise may traverse the Layer 2 network towards the PER in the IP network. For example, a virtual connection such as a Permanent Virtual Circuit (PVC) may be established for the customer through a Layer 2 network, e.g., an ATM network, from the switch/router functioning as the PER in the IP network. For illustration purposes, connectivity is illustrated in FIG. 1 between NEs 109, 111, 118, 119 and 120. However, it should be noted that NEs 109, 111, 118, 119 and 120 can be connected in any manner as specified by the network service provider. In one embodiment, for example, one or more IP trunks between edge and/or core routers in network 110 may ride on one or more PVCs 117.

In one embodiment, the PVC is established based on a prediction of the load for the customer traffic. For example, the capacity for a PVC may be 2 Mb/s. The traffic from multiple PVCs is carried over trunks that are configured between switches. For example, a trunk of 15 Mb/s may be dedicated for Layer 3 customer traffic. Traffic from other trunks and the trunk dedicated for Layer 3 may then be combined and provided to the IP network over a Layer 2 link (e.g. an ATM link of 45 Mb/s). However, when the service is activated for a customer, the actual load from the customer may be different than the anticipated load. For example, a PVC may have more traffic than originally anticipated. This lead to the situation where one or more trunks carrying the PVC may exceed their desirable utilization levels.

Figure 2:
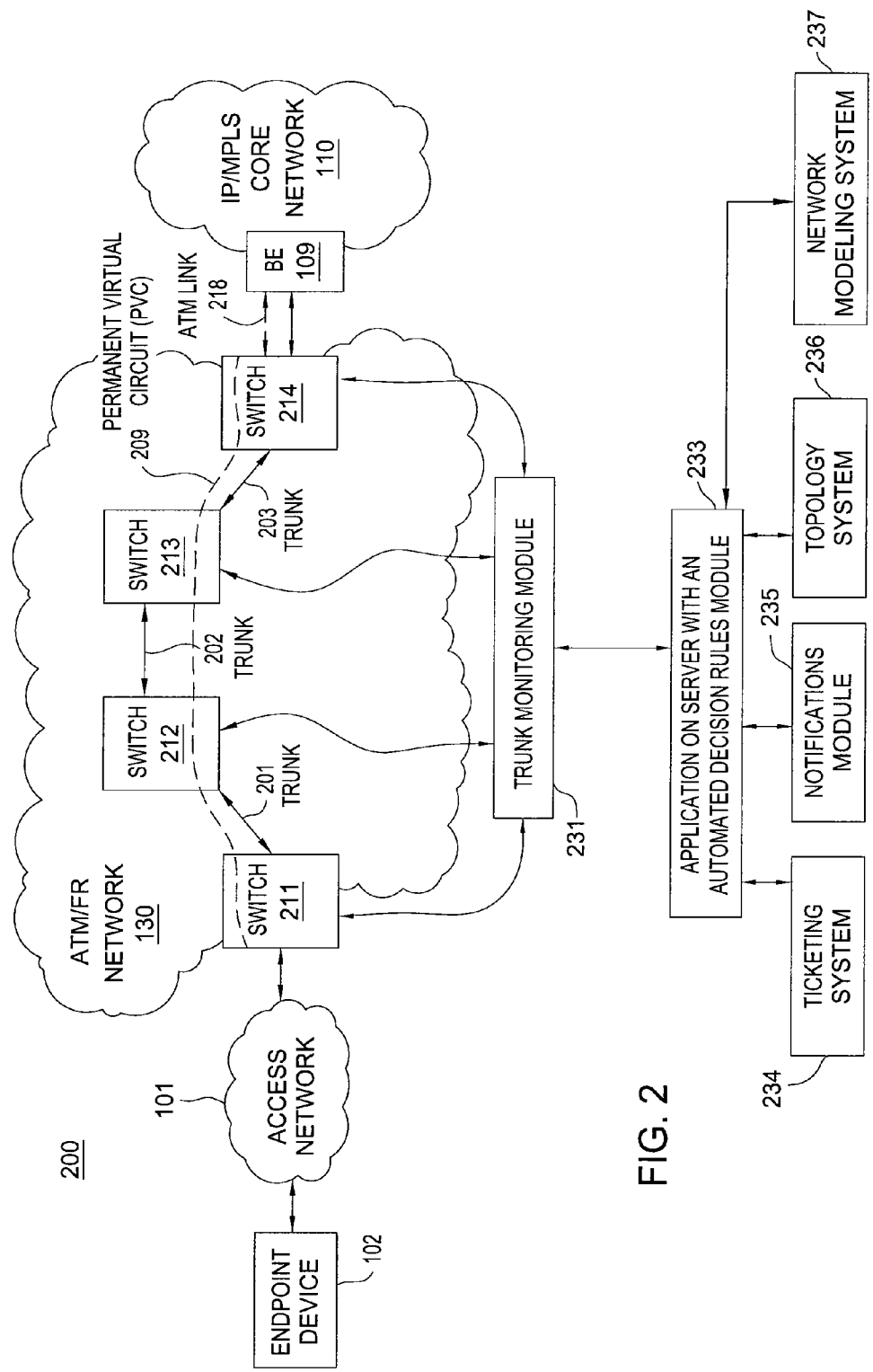
FIG. 2 illustrates an exemplary network for providing resizing of a trunk in a network.

In one embodiment, the current invention provides a method for resizing of a trunk in a network. FIG. 2 illustrates an exemplary network 200 in accordance with one embodiment of the current invention for resizing of a trunk in a network. For example, a customer may use the endpoint device 102 to obtain a service from an IP/MPLS core network 110. Traffic between the endpoint device 102 and the IP/MPLS core network 110 may traverse the access network 101 and the ATM/FR network 130. The endpoint device 102 is connected to an ATM/FR switch 211 located in the ATM/FR network 130 through the access network 101. The ATM/FR network 130 may contain a plurality of ATM/FR switches 211-214. The ATM/FR switch 211 is providing the functioning for the ATM/FR network 130 for packets originated by customer endpoint device 102. Trunk 201 connects ATM/FR switches 211 and 212. Trunk 202 connects ATM/FR switches 212 and 213. Trunk 203 connects ATM/FR switches 213 and 214. The ATM link 218 connects the ATM/FR switch 214 to the IP/MPLS core network 110 through a PER 109. An illustrative Permanent Virtual Circuit 209 is established/built connecting ATM/FR switches 211 and 214 over trunks 201, 202 and 203 for providing a service to the customer endpoint device 102. Traffic from customer endpoint device 102 directed towards IP/MPLS core network 110, traverses the ATM/FR network 130 using the permanent virtual circuit 209.

In one embodiment, a trunk monitoring module 231 is connected to switches 211-214. The trunk monitoring module 231 is tasked with monitoring the status of the trunks and PVCs. For example, when the trunk monitoring module 231 receives an alert or a ticket, it may notify the application server 233. In turn, using the received notification(s), the service provider may implement a method for providing resizing of a trunk in the application server 233 as further disclosed below.

In one embodiment, the application server 233 (the server with the automated decisions rule module) is also connected to a ticketing system 234, a notifications module 235, a network topology system 236 and a network modeling system 237. The network topology system 236 may be used to store the network topology including an association of PVCs, trunks, ports and switches (nodes). For example, PVC 209 may be associated with various ports on switches 211-214. The ticketing system 234 is for generating a ticket, if necessary, and the notifications module 235 is for generating one or more notifications, e.g., a notification to an enterprise customer as to the detection of overutilization or underutilization of a PVC and/or trunk. The network modeling system 237 may be used for computing the worst case expected utilization of a PVC and/or trunk under a set of failure scenarios of network elements using well known simulation or analytic models of the network. In one embodiment, network modeling system 237 may contain a load forecast module that employs well known forecasting methods and historical load data to estimate future loads on PVCs and/or trunks in the network. Such load forecast would be an input to the network model. Application server 233 may then perform the resizing of one or more trunks between pairs of switches.

In one embodiment, application server 233 may contain an automated decision rules module for resizing trunks. For example, the resizing of trunks of the current invention may be invoked by first setting a maximum utilization target level U, a minimum utilization target level L, and target utilization level u derived from a right-sizing formula as disclosed below.

A right-sizing formula for a target utilization level u may initially set u based on forecast of load volumes for trunks. For example, u may be set to 80%, with respect to expected $95^{th}$ percentile level of the load. Percentile is a value on a scale that indicates the percent of a distribution that is equal to it or below it. In one embodiment, the formula for right-sizing u also takes into account expected growth. For example, if a growth of 15% is expected, the method may set u based on $95^{th}$ percentile level of the load plus a growth of 15%. A trunk size S may then be S=Roundup to nearest practical trunk size $$\left\{ \frac{(1 + \text{growth rate}) \times p^{95}}{\text{target utilization rate}} \right\}.$$

For the example above, the trunk size S is set to S=Roundup $$\left\{ \frac{(1 + 0.15) \times p^{95}}{0.8} \right\}.$$

That is, u is set such that it is appropriately sized for an observed trunk load volume plus a growth of 15% observed for the trunk. The trunk may then be resized to S. Once the value for u is selected, the values for U and L may be provided as functions of u. For example, U=1.2×u and L=0.85×u.

In one embodiment, the trunk monitoring module 231 gathers trunk load data from switches in the network in accordance with a pre-determined time period. For example, the trunk monitoring module 231 gathers trunk load data from switches 211-214 every 5 minutes, every 10 minutes, every hour, every day, and so on. The predetermined time period can be varied in accordance with requirements of a particular implementation. For trunks that are being monitored for resizing, the trunk monitor module forwards the gathered data to the application server 233.

The application server 233 receives the trunk load and tracks peak load for one or more predetermined time periods. For example, it may keep track of: 5 minute peak load volumes, hourly peak load volumes, daily peak load volumes, monthly peak load volumes, and so on. For example, a 5 minute peak volume may be 30 Mb/s of traffic flow.

In one embodiment, the current method may also track a predetermined percentile of the peak load over a predetermined period of time. For example, the current method may track the $75^{th}$ percentile, $95^{th}$ percentile, etc. of the 5 minute peak load volumes over 30 days. Tracking the $95^{th}$ percentile is equivalent to tracking the $2^{nd}$ largest peak load volume. Namely, the $95^{th}$ percentile peak load volume is the same as the $2^{nd}$ largest peak load volume in the collected data and is referred to as $p^{95}$.

The method then determines if one or more trigger points for resizing of one or more trunks are reached. A trunk may have multiple trigger points, e.g., daily trigger points, monthly trigger points, etc. For example, at the end of a 24 hour period, the method may determine if one or more 5 minute peak load volumes for a trunk over a 24 hour period exceeded the maximum target utilization level. In another example, at the end of a month, the method may determine if a trunks $95^{th}$ percentile peak load volume either dropped below the minimum target utilization level ($p^{95}$<L) or exceeded the maximum target utilization level ($p^{95}$>U).

For example, if the monitor gathered peak load volumes for a trunk every 5 minutes, then there will be 288 peak load volume data points for the trunk over a 24 hour period. If one or more of the 288 peak load volumes exceeded the maximum target utilization level U, the trunk may be considered for resizing based on a daily trigger point. In one embodiment, if a trunk exceeds the maximum target utilization level U on two consecutive measurement intervals, the trunk is resized. For example, if some 5 minute peak load volume for a trunk exceeds the maximum target utilization level U for two (2) consecutive days, the trunk may be resized. For example, a trunk may be placed on a watch list if some 5 minute peak volume over a 24 hour period exceeds the maximum utilization level. If the data for the next 24 hour period also shows one or more 5 minute peak volumes exceeding the maximum target utilization level U, then the trunk may be resized.

The method may then create a ticket (if one is not already created) and invokes resizing of one or more trunks in a network. For example, the method determines the appropriate values for trunk sizes and creates tickets such that the capacities of said trunks are adjusted. For example, the application server may provide the appropriate trunk sizes to a provisioning system or personnel.

In one embodiment, if a trunk exceeds the maximum target utilization level U for a predetermined number of measurement intervals over a predetermined time period, the trunk is resized. For example, if some 5 minute peak load volume for a trunk exceeds the maximum target utilization level U for 3 out of 30 days, the trunk is resized.

In one embodiment, a trigger point for resizing a trunk may be based on the larger of either a worst case utilization level for a network with one or more failures or a target utilization level with no failure. For example, a trunk may be resized to a larger size if its $95^{th}$ percentile peak load volume exceeds the quantity: Maximum{95% utilization rate assuming one or more failures in the Layer 3 network, 80% utilization level assuming no failures in the Layer 3 network}.

In one embodiment, the worst case utilization and/or growth rate of a trunk may be estimated by a simulation or an analytic network model contained in the network modeling system 237.

In one embodiment, the service provider disables trunk and/or PVC overbooking to minimize the chance of Layer 3 packet losses. For example, 10 PVCs of 10 Mb/s may be sharing a trunk of 90 Mb/s by overbooking. This exists in networks where the peak volumes from all customers are unlikely to overlap. However, since the current invention enables the capacity of the trunks to be right sized, overbooking over right sized trunks may cause packet loss. Thus, in one embodiment, trunk and/or PVC overbooking is disabled. In another embodiment, the service provider may allow overbooking by taking into account the amount of overbooking.

In one embodiment, the current method may resize one or more PVCs established over one or more trunks. For example, the trunks may be the appropriate size but a PVC may have a capacity too small or too large for the customer. In another example, one or more PVCs providing the trunking function in an IP/MPLS network established over a physical trunk need to be resized to carry the required amount of traffic in the core of the network.

Figure 3:
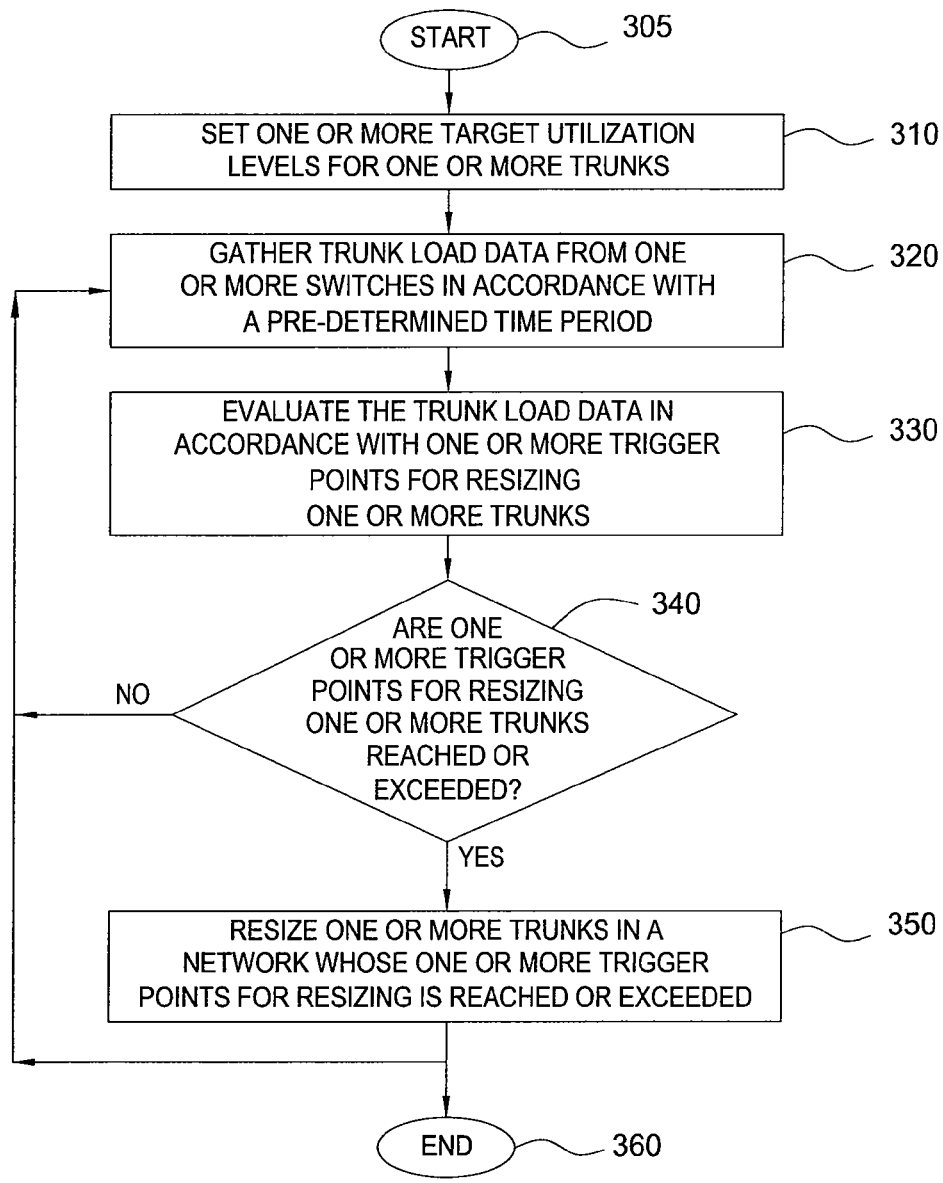
FIG. 3 illustrates a flowchart of a method for providing resizing of a trunk in a network.

FIG. 3 illustrates a flowchart of a method 300 for providing resizing of a trunk in a network. For example, method 300 can be implemented by the application server 233. Method 300 starts in step 305 and proceeds to step 310.

In step 310, method 300 sets one or more target utilization levels for one or more trunks. For example, the method sets a maximum utilization target level U, a minimum utilization target level L, and a target utilization level u for one or more trunks. For example, the service provider may have traffic forecast data and may initialize a target utilization level u, a maximum utilization target level U, and a minimum utilization target level L based on the forecast. In one embodiment, the utilization parameters are settable network wide. In another embodiment, the utilization parameters are set for each trunk.

In step 320, method 300 gathers trunk load data from one or more switches in accordance with a pre-determined time period. For example, trunk load data may be gathered for every 5 minute interval, for every hour, etc.

In step 330, method 300 evaluates the trunk load data in accordance with one or more trigger points for resizing the one or more trunks. For example, it may keep track of: 5 minute peak load volumes, hourly peak load volumes, daily peak load volumes, monthly peak load volumes, $95^{th}$ percentile of daily peak load volumes, etc. The method may then evaluate if a trigger point is reached for resizing on a daily basis, monthly basis, etc. It should be noted that a trunk may have multiple trigger points, e.g., daily trigger points, monthly trigger points, etc. For example, at the end of a 24 hour period, the method may determine if one or more 5 minute peak load volumes for a trunk over a 24 hour period may have exceeded the maximum target utilization level. In another example, at the end of a month, the method may determine if a trunks $95^{th}$ percentile peak load volume either dropped below the minimum target utilization level ($p^{95}$<L) or exceeded the maximum target utilization level ($p^{95}$>U).

In step 340, method 300 determines if one or more trigger points for resizing the one or more trunks is reached or exceeded. If one or more trigger points for resizing the one or more trunks are reached or exceeded, the method proceeds to step 350. Otherwise, the method proceeds to step 320 to continue gathering data.

In step 350, method 300 resizes the one or more trunks in a network whose one or more trigger points for resizing are reached or exceeded. For example, the method may determine the appropriate trunk sizes for the one or more trunks and create one or more tickets (if tickets are not already created) such that the capacities of the trunks are adjusted by provisioning personnel or a provisioning system. The method then ends in step 360 or returns to step 320 to continue gathering more data.

It should be noted that although not specifically specified, one or more steps of method 300 may include a storing, displaying and/or outputting step as required for a particular application. In other words, any data, records, fields, and/or intermediate results discussed in the method can be stored, displayed and/or outputted to another device as required for a particular application. Furthermore, steps or blocks in FIG. 3 that recite a determining operation or involve a decision, do not necessarily require that both branches of the determining operation be practiced. In other words, one of the branches of the determining operation can be deemed as an optional step.

It should be noted that the above disclosure provides certain values, e.g., 80% and 95$^{th}$ percentile and the like. These values are only provided as examples to illustrate the present invention and should not be interpreted as limiting the scope of the present invention.

Figure 4:
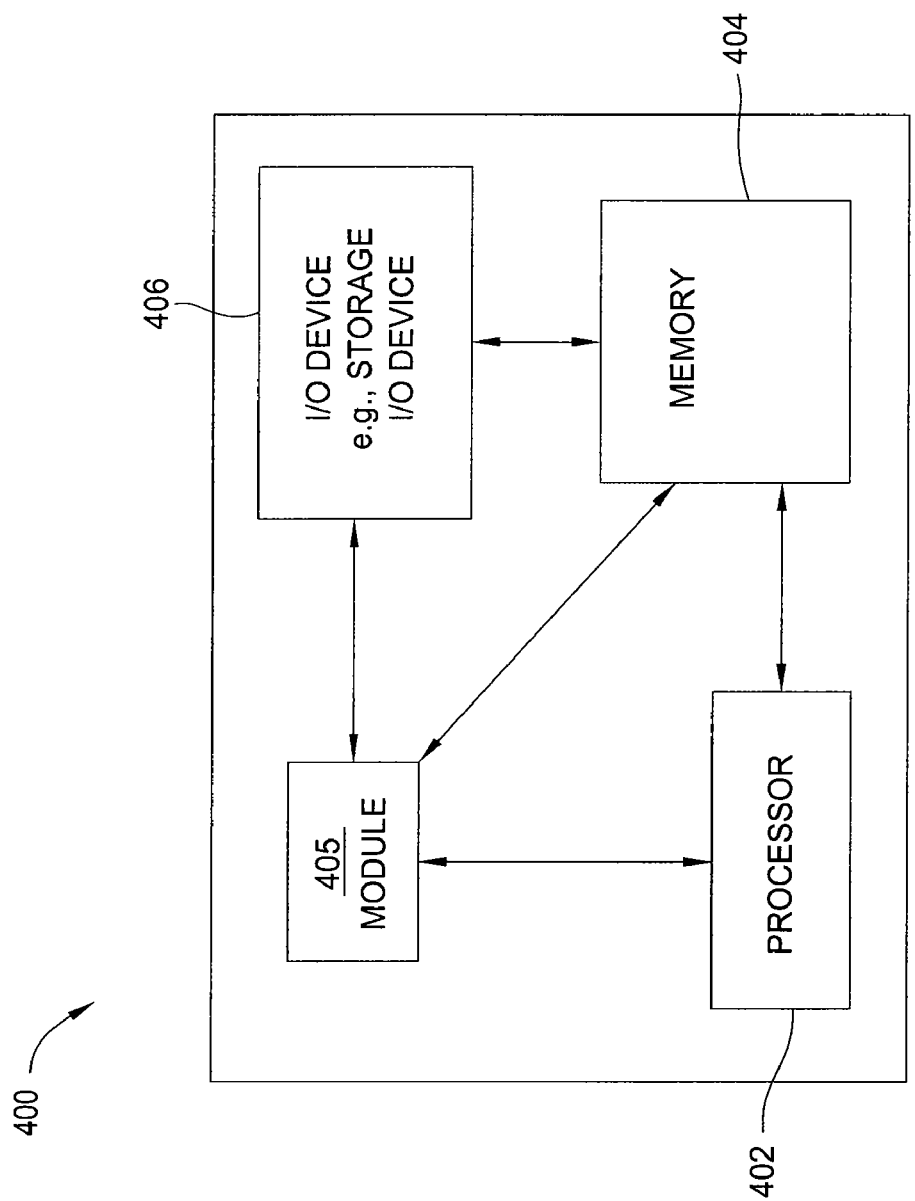
FIG. 4 illustrates a high-level block diagram of a general-purpose computer suitable for use in performing the functions described herein.

FIG. 4 depicts a high-level block diagram of a general-purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 for providing resizing of a trunk in a network, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 405 for providing resizing of a trunk in a network can be loaded into memory 404 and executed by processor 402 to implement the functions as discussed above. As such, the present method 405 for providing resizing of a trunk in a network (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for resizing of a trunk in a network, comprising:

setting a target utilization level for the trunk, wherein the trunk is deployed within the network;

gathering trunk load data from a switch in the network in accordance with a first pre-determined time period;

evaluating via a processor the trunk load data in accordance with a trigger point for resizing the trunk, wherein the trigger point is based on the target utilization level, wherein the resizing the trunk comprises increasing a trunk size of the trunk; and resizing the trunk if the trigger point is reached.

2. The method of claim 1, wherein a predetermined percentile of a peak load volume for the trunk is tracked over a second pre-determined time period.

3. The method of claim 1, wherein the trunk is resized if the trunk exceeds a maximum target utilization level on two consecutive measurement intervals.

4. The method of claim 1, wherein the trunk is resized if the trunk exceeds a maximum target utilization level for a predetermined number of measurement intervals over a second pre-determined time period.

5. The method of claim 1, wherein the trigger point is based on a larger of either a worst case utilization level for the network with a failure or a target utilization level for the network with no failure.

6. The method of claim 1, further comprising:

disabling overbooking of the trunk.

7. The method of claim 1, wherein the resizing further resizes a permanent virtual connection.

8. A non-transitory computer-readable storage medium having stored thereon a plurality of instructions, the plurality of instructions including instructions which, when executed by a processor, cause the processor to perform a method for resizing of a trunk in a network, comprising:

setting a target utilization level for the trunk, wherein the trunk is deployed within the network;

gathering trunk load data from a switch in the network in accordance with a first pre-determined time period;

evaluating via a processor the trunk load data in accordance with a trigger point for resizing the trunk, wherein the trigger point is based on the target utilization level, wherein the resizing the trunk comprises increasing a trunk size of the trunk; and resizing the trunk if the trigger point is reached.

9. The non-transitory computer-readable storage medium of claim 8, wherein a predetermined percentile of a peak load volume for the trunk is tracked over a second pre-determined time period.

10. The non-transitory computer-readable storage medium of claim 8, wherein the trunk is resized if the trunk exceeds a maximum target utilization level on two consecutive measurement intervals.

11. The non-transitory computer-readable storage medium of claim 8, wherein the trunk is resized if the trunk exceeds a maximum target utilization level for a predetermined number of measurement intervals over a second pre-determined time period.

12. The non-transitory computer-readable storage medium of claim 8, wherein the trigger point is based on a larger of either a worst case utilization level for the network with a failure or a target utilization level for the network with no failure.

13. The non-transitory computer-readable storage medium of claim 8, further comprising:

disabling overbooking of the trunk.

14. The non-transitory computer-readable storage medium of claim 8, wherein the resizing further resizes a permanent virtual connection.

15. An apparatus for resizing of a trunk in a network, comprising:
  a processor configured to:
    set a target utilization level for the trunk, wherein the trunk is deployed within the network;
    gather trunk load data from a switch in the network in accordance with a first pre-determined time period;
    evaluate the trunk load data in accordance with a trigger point for resizing the trunk, wherein the trigger point is based on the target utilization level, wherein the resizing the trunk comprises increasing a trunk size of the trunk; and
    resize the trunk if the trigger point is reached.

16. The apparatus of claim 15, wherein a predetermined percentile of a peak load volume for the trunk is tracked over a second pre-determined time period.

17. The apparatus of claim 15, wherein the trunk is resized if the trunk exceeds a maximum target utilization level on two consecutive measurement intervals.

18. The apparatus of claim 15, wherein the trunk is resized if the trunk exceeds a maximum target utilization level for a predetermined number of measurement intervals over a second pre-determined time period.

19. The apparatus of claim 15, wherein the trigger point is based on a larger of either a worst case utilization level for the network with a failure or a target utilization level for the network with no failure.

20. The apparatus of claim 15, wherein the processor is configured to resize the trunk by resizing a permanent virtual connection.

* * * * *